(No Model.)

J. J. LANGLES.
CONTINUOUS DOUGH PRESS.

No. 375,168.     Patented Dec. 20, 1887.

WITNESSES:          INVENTOR:
Anas. Niaa          J. J. Langles
C. Sedgwick      BY Munn & Co.
                    ATTORNEYS.

United States Patent Office.

JUSTIN J. LANGLES, OF NEW ORLEANS, LOUISIANA.

CONTINUOUS DOUGH-PRESS.

SPECIFICATION forming part of Letters Patent No. 375,168, dated December 20, 1887.

Application filed March 29, 1887. Serial No. 232,868. (No model.)

*To all whom it may concern:*

Be it known that I, JUSTIN J. LANGLES, of New Orleans, in the parish of Orleans and State of Louisiana, have invented a new and Improved Continuous Dough-Press, of which the following is a full, clear, and exact description.

The object of my invention is to provide a new and improved press for pressing dough in continuous strips or sheets.

The invention consists of the combination of parts, including their construction, substantially as will be fully described hereinafter, and then pointed out in the claims.

Reference is to be had to the accompanying drawings, forming a part of this specification, in which similar letters of reference indicate corresponding parts in all the figures.

Figure 1:
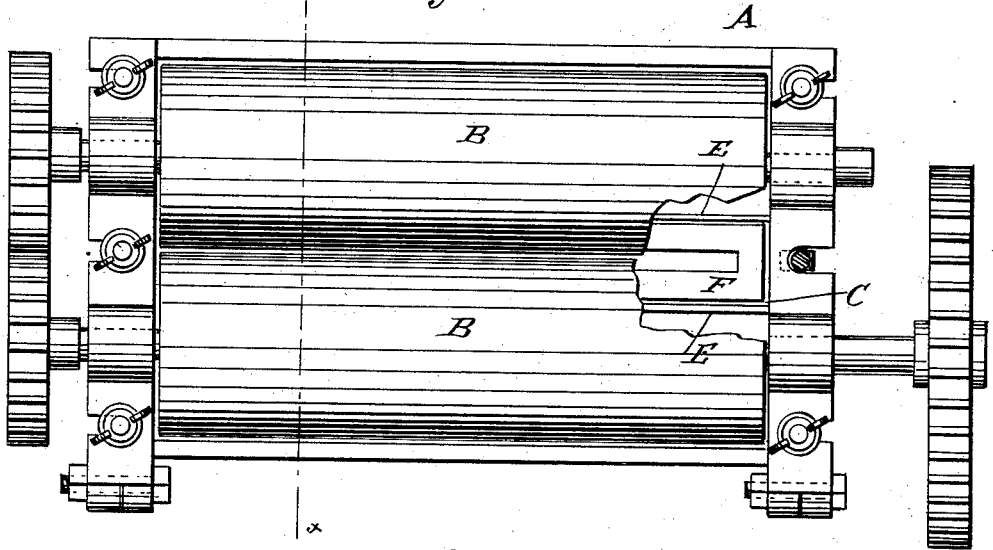
Figure 3:
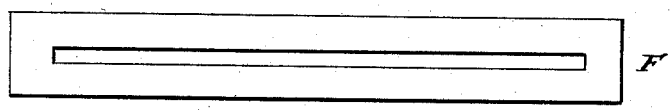
Figure 4:
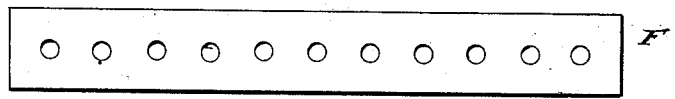
Figure 2:
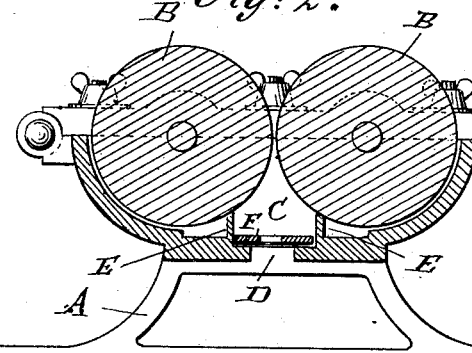

Figure 1 is a plan view of my improvement, parts being in section. Fig. 2 is a vertical cross-section of the same on the line $x\ x$ of Fig. 1; and Figs. 3 and 4 are plan views of dies used in connection with the machine.

On a suitably-constructed frame, A, are mounted the rollers B B, placed alongside each other and rotated toward each other by suitable gear-wheels or other means. The rollers B B open into a trough, C, formed on the frame A between said two rollers, and in the middle of the bottom of the trough is formed a slot or a series of apertures, D, through which the dough is discharged.

The ends of the trough C are formed by the ends of the frame A, and the two sides E of the trough are either straight or curved and extend with their upper edges in close contact with the rollers B B, so that when dough is placed between the two rollers B on top the rotation of the rollers toward each other forces the dough into the trough, which is completely filled with dough, which is pressed out by the continuous charging of the trough with dough by the rollers through the slot or aperture D. The dough just pressed out assumes in cross-section the shape of the slot or the aperture D, and as the operation is continuous the dough is formed into continuous strips or sheets.

In order to produce with one machine dough of several forms in cross-section, I employ dies F, which are either placed in the bottom of the trough or secured to the under side of the same by screws or other means. The dies F are provided in the middle with slots or round, square, oblong, or differently-shaped apertures, which register with the slot D in the bottom of the trough, so that by providing the bottom of the trough with one of the dies the dough is formed into a strip or sheet of a cross-section corresponding with the slots or apertures in the respective dies.

The caps of the bearings of the rollers B are removable to permit of placing the dies F into the trough.

Having thus described my invention, what I claim as new, and desire to secure by Letters Patent, is—

1. In a continuous dough-press, the combination, with a frame, of plain rollers journaled in the frame and revolving toward each other, and a trough arranged between the rollers and having an aperture in its bottom, the sides of the trough extending in close contact with the rollers, substantially as herein shown and described.

2. In a continuous dough-press, the combination, with the frame A and the plain rollers B, journaled therein, of the trough C, arranged between the rollers, with its sides in close proximity to the rollers, and provided with an aperture in its bottom, and dies in the bottom of the trough, substantially as herein shown and described.

JUSTIN J. LANGLES.

Witnesses:
THEO. G. HOSTER,
C. SEDGWICK.